United States Patent Office 3,536,916
Patented Oct. 27, 1970

3,536,916
RADIATION MEASURING DEVICE AND TECHNIQUE
George Gustave Anton Boehm, Great Neck, N.Y., assignor to Radiation Processing, Inc., Westbury, N.Y., a corporation of Delaware
No Drawing. Filed Apr. 2, 1968, Ser. No. 718,250
Int. Cl. G01t 1/02
U.S. Cl. 250—83        13 Claims

ABSTRACT OF THE DISCLOSURE

Disclosure describes a method for controlling and measuring the amount of energy imparted to a radiated body by providing a composition containing a compound which is subject to a measurable amount of vinyl decay when subjected to ionizing radiation, measuring the vinyl decay caused by various amounts of radiation of the composition so as to provide a standard which can be compared with the radiated body.

BACKGROUND OF INVENTION

In recent years the use of ionizing radiation, particularly α-radiation, γ-radiation, and electron radiation, to effect chemical and physical changes in various substrates has become increasingly important. Radiation techniques have been used for such diverse purposes as sterilizing foods and modifying polymers.

One of the problems which has arisen in connection with radiation techniques is the determination of the effectiveness of the radiation, that is the amount of energy actually absorbed by or imparted to the body which is subjected to the radiation treatment. This is normally referred to as determining the "dose" of radiation, and the various measurement techniques have been called dosimetry. All bodies do not absorb the same amount of energy when subjected to the same amount of radiation. For example, plastic compositions may absorb a relatively large amount of energy compared to metallic bodies. It thus becomes necessary to establish the energy imparted to a body in order to perform meaningful experiments and draw useful conclusions.

Two classes of dosimetry techniques are employed—the absolute procedures and the relative procedures. The absolute procedures, as the name implies are designed to determine the exact amount of energy taken up by a radiated body. The two most widely employed methods are based on measurements of heat and ionic charge. While these are capable of giving quite acceptable results, they are inconvenient and difficult to utilize. Accordingly, a number of secondary standards have been devised in which the necessary measurements are less complicated. The results depend on a prior calibration of the secondary standard with at least one absolute standard. One of the most widely employed secondary standards is the ferrous sulfate dosimeter in which the absorption of radiation causes oxidation of the ferrous ion to the ferric state. It is not totally satisfactory for a number of known reasons. Accordingly, other procedures have been devised, but these too suffer from various deficiencies.

THE INVENTION

It has been observed that various organic compounds having terminal vinyl groups lose their unsaturation when subjected to ionizing radiation. This loss of unsaturation has been termed vinyl decay. It has been discovered that this vinyl decay can be used as a measure of absorbed energy by providing compositions comprising a vinyl group containing organic compound which is subject to a measurable amount of vinyl decay when subjected to ionizing radiation. The organic compound is provided in an inert carrier. The term "inert" as used herein means that the carrier has no appreciable chemical or physical reaction with the vinyl group containing compound and does not interfere with the procedure utilized to measure vinyl decay. The compositions serve as secondary standards and can be calibrated against a primary standard. They can then be used to measure and control the energy imparted to a radiated body by subjecting a sample of the composition to the same radiation conditions as the body in question.

It will be recognized by those skilled in the art that another calibration may be required in addition to the calibration against the absolute standard. As aforesaid, all material do not absorb the same amount of energy when subjected to the same amount of radiation. It would, therefore, be necessary to calibrate the composition against the radiated body when the body and the composition are of different energy absorptive capacities. If, for example, the body being irradiated was polyethylene and the carrier for the composition was polyethylene, no additional calibration would normally be necessary. On the other hand, if the same composition was employed and the radiated substrate was a polyurethane elastomer, a second calibration would preferably be employed.

Suitable carriers for the compositions of this invention can be selected from a variety of materials so long as they are inert as defined above. Any of a number of elastomers could be used, for example, polyurethane, polyvinyl halides, polyamides, and the like. Preferably the carrier is one which can be deposited as a thin film, i.e. a film having a thickness of from about one to ten mils. Polyolefins, such as polyethylene, polypropylene or polyisobutylene are preferred since they are easily laid down as films, and because their reactions to radiation conditions have been so widely explored. The films employed are preferably from about two to four mils in thickness since these best combine the desiderata of physical strength, ease of preparation and reproducibility of results.

Films may be prepared by melting the carrier and the vinyl compound together and depositing the melt on a smooth surface, or the composition may be dissolved and the solution evaporated to leave the film. Under certain conditions it may be desirable to prepare the film at the point of use so that it can be made of the desired thickness and shape. Therefore, the compositions may be prepared and sold in powdered form for melting, or in solution. It is anticipated, however, that the compositions will ordinarily be sold as thin films from which the desired sample can be cut. The advantage of this procedure is that films of standardized thickness can be prepared and utilized in all laboratories or commercial operations so that results obtained by one group of technicians are directly comparable with those obtained by others.

A number of vinyl sources are available. For example, styrene or vinyl substituted polystyrene could be used. Alpha or beta vinyl naphthalene could also be utilized. The preferred vinyl sources are unsaturated hydrocarbons containing from nine to twenty carbon atoms in a continuous chain and having a terminal vinyl group. Nonene-1 and eicosene-1 are typical examples. The latter is preferred since it is readily available, commercially, and is totally compatible with the preferred carrier, polyethylene. There may be substituents such as alkyl groups on the continuous hydrocarbon chain, but it is preferred that the number two carbon atom be free of substituents other than hydrogen since these substituents may affect the position of the vinyl peak in the infrared spectra. Thus 3,4-dimethyl-dodecene-1 would be preferable to the corresponding 2,3-dimethyl compound as a vinyl source.

As is known, the vinyl peak in the infrared spectra appears at 11 microns. The intensity of this peak can be utilized as a measure of vinyl decay in a compound. This is the preferred measuring tool, although other procedures, particularly ultraviolet measurements, may also be employed. The carrier should be one which does not interfere with the determination of the 11 micron peak in infrared analysis if this is the selected method for determining vinyl decay. Similarly it should be one which is inert, i.e. does not interfere if another method of measurement is selected.

The concentration of the vinyl source in the dosimetry composition may vary within rather wide limits. There should be sufficient vinyl source present so that a measurable amount of vinyl decay may be observed. On the other hand, if the concentration of vinyl groups is too high the rate of decay may not follow the desired pattern. For most practical purposes a concentration of from about 0.25% to 15% based on the total weight of the composition is suitable. As the molecular weight of the vinyl source increases, the concentration of the vinyl groups decreases. Thus a fixed weight of nonene-1 will provided more vinyl groups than the same weight of eicosene. With nonene-1 the best results are obtained at concentrations from 0.25 to 7%. With eicosene best results are observed at concentrations from 0.5 to 15%. Optimum concentrations vary somewhat with the thickness of the film.

In operation as a tool for control or as a tool for measurement, the compositions of this invention will first be calibrated to determine their response to fixed amounts of radiation. They will then be subjected to the same radiation conditions as the sample body, preferably simultaneously. From an analysis of the radiation results on the composition, the dose absorbed by the sample body can be determined.

The process of the invention as it would be applied using infrared analysis will now be explained in detail. For convenience, the process will be decribed using a thin film of polyethylene containing eicosene-1. The steps are as follows:

(A) Determination of the molar extinction coefficient of vinyl groups in the polyethylene composition containing a fixed quantity of eicosene-1. This is accomplished by taking an infrared spectrum of the sample in the region of 11 microns. Molar absorption is then determined by the formula:

$$\log To/T = A$$

where T and $To$ are transmissions as determined from the curve. $To$ is the transmission that would be obtained if no vinyl group were present, T is the observed transmission. Molar extinction coefficient is then determined from the formula:

$$E = (Cv_1)d/A$$

where $Cv_1$ is the concentration of vinyl groups in the composition as prepared and $d$ is the thickness of the sample.

(B) Calibrate vinyl decay against absolute dosimeter.

To use the composition for gamma radiation, the dose from a gamma source is first determined by absolute dosimetry. A film of the polyethylene-eicosene composition is then subjected to the same dose and the infrared spectrum of the radiated composition determined. The vinyl concentration of the radiated composition is then determined from the formula:

$$Cv_2 = A/Ed$$

where $Cv_2$ is the vinyl concentration of the radiated composition. A number of $Cv_2$ values are determined at various absolute dosages and from these values it is possible to prepare a curve on graph paper plotting this ratio as the ordinate and absolute dosage as the abscissa.

For use of the compositions in connection with electron irradiation a similar plot is prepared using fixed dosages of this type of radiation.

By this technique curves are prepared from which the amount of energy absorbed by the composition under a variety of radiation conditions can be readily determined. Thus, if $Cv_1$ is known, $Cv_2$ can be measured by infrared analysis and the dosage read from the curve. It is apparent that if the body under investigation is one which absorbs energy in substantially the same manner as the composition, or if the ratio of energy absorption between the body and the composition is known, the amount of energy absorbed by the body can be measured or controlled by observing the amount of energy absorbed by the composition.

The compositions of this invention are particularly useful in the range of from about 1 to 20 megarads which is the most interesting range for commercial application of radiation chemistry. The range may be extended to lower energy values by incorporating a vinyl decay accelerator in the composition. An accelerator is a compound which increases the rate of vinyl decay so that it becomes measurable at low energy values, for example, $10^5$ rads to 2 megarads. It is a compound such as anthracene or styrene which takes up energy easily and holds it so that the energy is available to increase the rate of vinyl decay by known reaction mechanisms. Styrene or vinyl substituted polystyrene are especially useful for this purpose since it can serve both as an accelerator and as a vinyl source.

While this invention has been described principally utilizing the tool of vinyl decay, the concept is also applicable to use in connection with vinylene group production which is another known result of radiation. As applied to vinylene production the dosimetry composition would contain a vinylene source instead of a vinyl source.

I claim:

1. A dosimetry composition comprising an inert carrier together with from about 0.25 to 15%, by weight, based on the total weight of the composition, of a dispersed vinyl group containing organic compound which is subject to measurable vinyl decay when exposed to ionizing radiation.

2. A composition as in claim 1 in the form of a thin film.

3. A dosimetry composition in the form of a thin film, said composition comprising a polyolefin carrier together with from about 0.25 to 15%, by weight, based on the total weight of the composition, of a dispersed vinyl group containing organic compound which is subject to measurable vinyl decay when exposed to ionizing radiation.

4. A film as in claim 3 in which the polyolefin is polyethylene.

5. A film as in claim 3 in which the vinyl group containing compound is an unsaturated hydrocarbon containing from nine to twenty carbon atoms in a continuous chain and a terminal vinyl group.

6. A dosimetry composition in the form of a thin film, said composition comprising a polyethylene carrier together with from about 0.25 to 15%, by weight, based on the total weight of the composition, of a dispersed unsaturated hydrocarbon containing from nine to twenty carbon atoms in a continuous chain and a terminal vinyl group, said hydrocarbon being subject to measurable vinyl decay when exposed to ionizing radiation.

7. A film as in claim 6 in which the unsaturated hydrocarbon is eicosene-1.

8. A process for controlling the energy imparted to a body by ionizing radiation which comprises measuring by observations of variations in intensity of absorption peaks in the region from the ultra-violet to the infra-red portion of the energy spectrum the amount of vinyl decay caused in a dosimetry composition comprising an inert carrier together with from about 0.25 to 15%, by weight, based on the total weight of the composition, of a dispersed vinyl group containing organic compound which is subject to measurable vinyl decay when exposed to ionizing radiation, and subjecting the said body to the same radiation conditions.

9. A process for controlling the energy imparted to a body by ionizing radiation which comprises measuring by observations of variations in intensity of absorption peaks in the region from the ultra-violet to the infra-red portion of the energy spectrum the amount of vinyl decay caused in a thin film of a dosimetry composition which is a polyolefin carrier together with from about 0.25 to 15%, by weight, based on the total weight of the composition of a dispersed vinyl group containing organic compound which is subject to measurable vinyl decay when exposed to ionizing radiation, and subjecting the said body to the same radiation conditions.

10. A process as in claim 9 in which the polyolefin is polyethylene.

11. A process as in claim 9 in which the vinyl group containing compound is an unsaturated hydrocarbon containing from nine to twenty carbon atoms in a continuous chain and a terminal vinyl group.

12. A process as in claim 9 in which the polyolefin is polyethylene and the vinyl group containing compound is an unsaturated hydrocarbon containing from nine to twenty carbon atoms in a continuous chain and a terminal vinyl group.

13. A process as in claim 9 in which the unsaturated hydrocarbon is eicosene-1.

References Cited
UNITED STATES PATENTS

| | | | |
|---|---|---|---|
| 2,700,736 | 1/1955 | Roberts | 250—83 |
| 2,962,592 | 11/1960 | Hoecker et al. | 250—83 |

RALPH G. NILSON, Primary Examiner

D. L. WILLIS, Assistant Examiner

U.S. Cl. X.R.

252—408